United States Patent [19]

Stark, Sr. et al.

[11] Patent Number: 4,627,466

[45] Date of Patent: Dec. 9, 1986

[54] VALVE AND ACTUATOR

[76] Inventors: Robert G. Stark, Sr., 735 NE. 198th St., Seattle, Wash. 98155; Robert G. Stark, Jr., 5731 SW. Idaho, Portland, Oreg. 97221; Tom Stark, 551 Lakeside Dr., Sedro Wooley, Wash. 98284; Joseph W. Anderson, 9845 NE. 22nd St., Bellevue, Wash. 98004

[21] Appl. No.: 773,373

[22] Filed: Sep. 5, 1985

[51] Int. Cl.[4] .................. F16K 11/044; F16K 31/145; F01B 19/00; F16J 3/02
[52] U.S. Cl. .................. 137/625.5; 251/61.5; 251/356; 92/98 D
[58] Field of Search .......... 137/625.5, 623.27; 251/904, 356, 357, 368, 625.48, 625.25, 625.66, 61.5, 61.4, 61.3, 61.1, 62, 63, 63.4, 63.5, 63.6, 356, 334, 333, 332, 318, 319, 320, 321, 322; 92/98 R, 99, 98 D, 101

[56] References Cited

U.S. PATENT DOCUMENTS

| 21,332 | 8/1858 | Fuller . | |
|---|---|---|---|
| 1,034,323 | 7/1912 | Tanner | 92/101 X |
| 1,785,279 | 12/1930 | MacClatchie | 251/357 |
| 2,639,728 | 5/1953 | Briechle | 137/622 |
| 2,782,801 | 2/1957 | Ludwig | 251/356 X |
| 3,283,670 | 11/1966 | Taplin | 92/99 |
| 3,375,760 | 4/1968 | Taplin | 92/99 |
| 4,128,110 | 12/1978 | Haytayan | 137/454.2 |
| 4,262,698 | 4/1981 | Fields | 137/625.5 |
| 4,354,525 | 10/1982 | Oyama et al. | 137/625.5 |
| 4,531,532 | 7/1985 | Zimmerly | 251/357 |

Primary Examiner—Martin P. Schwadron
Assistant Examiner—John S. Starsiak, Jr.
Attorney, Agent, or Firm—Seed and Berry

[57] ABSTRACT

A valve made from substantially all plastic parts that has integrally molded valve seats. A unique valve disk comprises two identical, mirror-image, molded plastic parts. The parts are of thin-walled construction but are joined together to give the valve body a substantially thick cross section with elongated shear surfaces in the radial direction. End flanges on the seal disk parts mechanically trap the soft sealing material and provide the maximum depth along the force line of contact between the sealing seat and the seal disk. The valve body has a cylinder and a cylinder cap of identically molded, mirror-image parts which house a diaphragm that overlies a plastic domed piston. The domed piston is provided with radially spaced circular ribs for supporting the diaphragm against excess deflection.

13 Claims, 4 Drawing Figures

VALVE AND ACTUATOR

TECHNICAL FIELD

The present invention generally relates to valves, and more particularly, to improved molded plastic valves.

BACKGROUND ART

In conventional valves of the type used in swimming pool or other water filtration systems and the like, cost and corrosion resistance are of paramount importance. Typically these valves will contain an influent port, an effluent port, and a drain port. Typically these valves are also constructed of cast metal parts, which are expensive to manufacture and are subject to considerable corrosion. U.S. Pat. Nos. 2,639,728; 4,128,110; and 21,332 disclose typical valve structures.

The low strength of unreinforced injection molded plastics typically is in the range of 4,000 to 10,000 psi tensile strength compared to 30,000 psi to 180,000 psi for steel. As a result, it has been difficult to manufacture an unreinforced plastic valve of sufficient strength to withstand the thrust forces of the valve actuator which reach 2,500 lbs in a 6" diameter valve, for example.

Some attempts have been made to construct components of valves out of less expensive, less corrosive plastic members. U.S. Pat. No. 4,262,698 describes one such attempt. The valve structure shown in U.S. Pat. No. 4,262,698 requires specially constructed valve seats and an expensive and complicated valve disk of plastic and steel.

DISCLOSURE OF INVENTION

It is an object of this invention to provide an improved plastic seal disk that is inexpensive to mold and assemble and that provides superior sealing capabilities.

Basically, the objects of the improved seal disk are accomplished by forming the seal disk of two identical, mirror-image, thin-walled plastic parts which are so constructed as to form a very thick transverse dimension cross section and elongated radial shear surfaces, with the softer sealing material mechanically interlocked to a peripheral end flange that holds the sealing material against inadvertent movement out of engagement with the sealing disk. The peripheral flanges on the mating parts of the seal disk are uniquely constructed also to withstand the reaction force from engagement of the disk with a valve seat by directing the force through the deepest cross section of the sealing material.

It is still another object of this invention to provide a valve disk actuator which is made of plastic and is inexpensive to mold and to assemble and which provides superior operating characteristics.

The object of the improved valve actuator for the sealing disk is best obtained by using a mirror-image, molded plastic part to form both the piston cylinder and the rod end cover of the cylinder. In addition, the piston is formed of a thin-walled, high-strength, domed piston having a plurality of radially spaced ribs for supporting a flexible piston diaphragm.

These improvements in the valve disk and the valve cylinder and piston enable substantial reductions in costs for these relatively large-diameter valves, with increased performance efficiency and less maintenance than conventional metal valves.

BEST MODE FOR CARRYING OUT THE INVENTION

Figure 1:
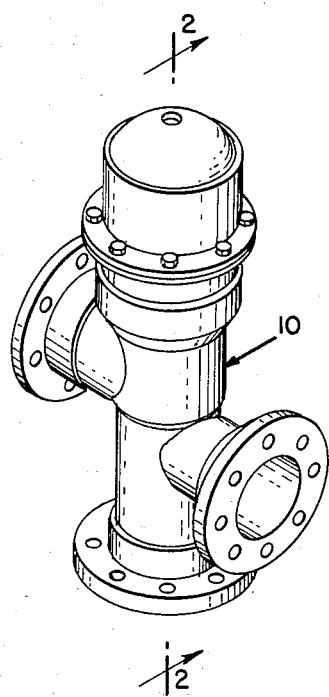
FIG. 1 is an isometric of a valve embodying the principles of the invention.

A valve embodying the principles of the invention includes a molded plastic body 10 having ports 12, 13 and 14.

Integrally molded at the entrance to port 13 is a circular valve seat 16 having a flat surface 17. A second valve seat 18 is also provided with a flat surface 19. The valve seat 18 is preferably molded separately and bonded to the entrance of the port 14.

A unique two-piece valve disk 20 is provided for sealing between the two valve seats 16 and 18. The valve disk includes two identically molded, thin-walled pieces 22 and 23. Since the pieces are identical, only one will be described. Piece 22 has a thin-walled, concave body 24 and a radially inner leg 26 having an abutment surface 27. The thin-walled, concave body 24 is formed at an angle with respect to the short leg 26 and terminates radially outward in an elongated shear surface 28.

The concave body is also provided with a half flange 30 having a radially outer, axially protruding lip 32 and a radially inner, axially protruding ledge 34, with the lip and ledge coming together in an inwardly depressed recess 36. A softer resilient sealing material 44 is preferably molded over the two disk pieces after they are interengaged with one another. Pilot pins 46 are inserted into matching holes in the opposite piece for positioning the two pieces together.

Figure 4:
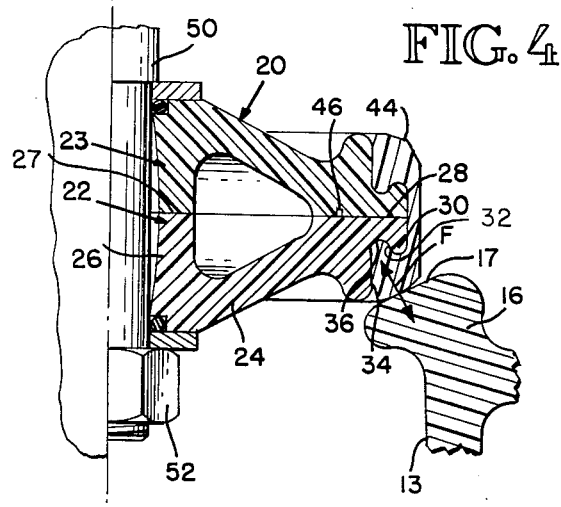
FIG. 4 is an enlarged fragmentary section of a portion of the valve.
Figure 3:
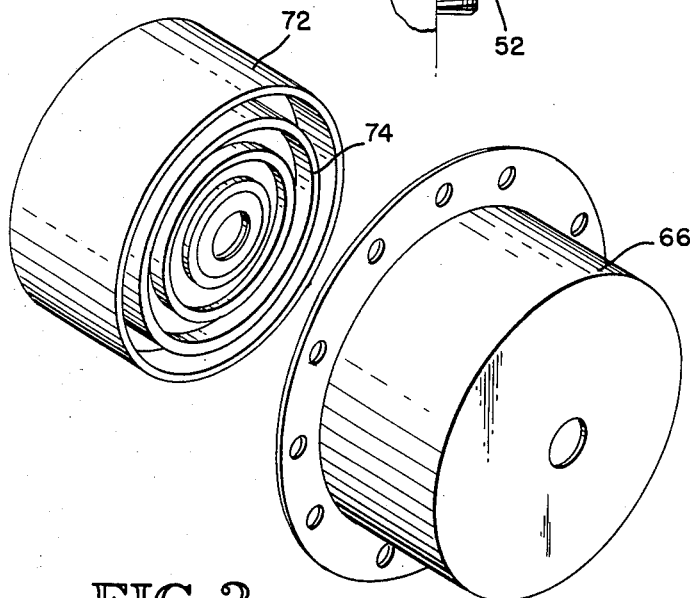
FIG. 3 is an enlarged, exploded isometric of a unique plastic piston and rubber diaphragm.
Figure 2:
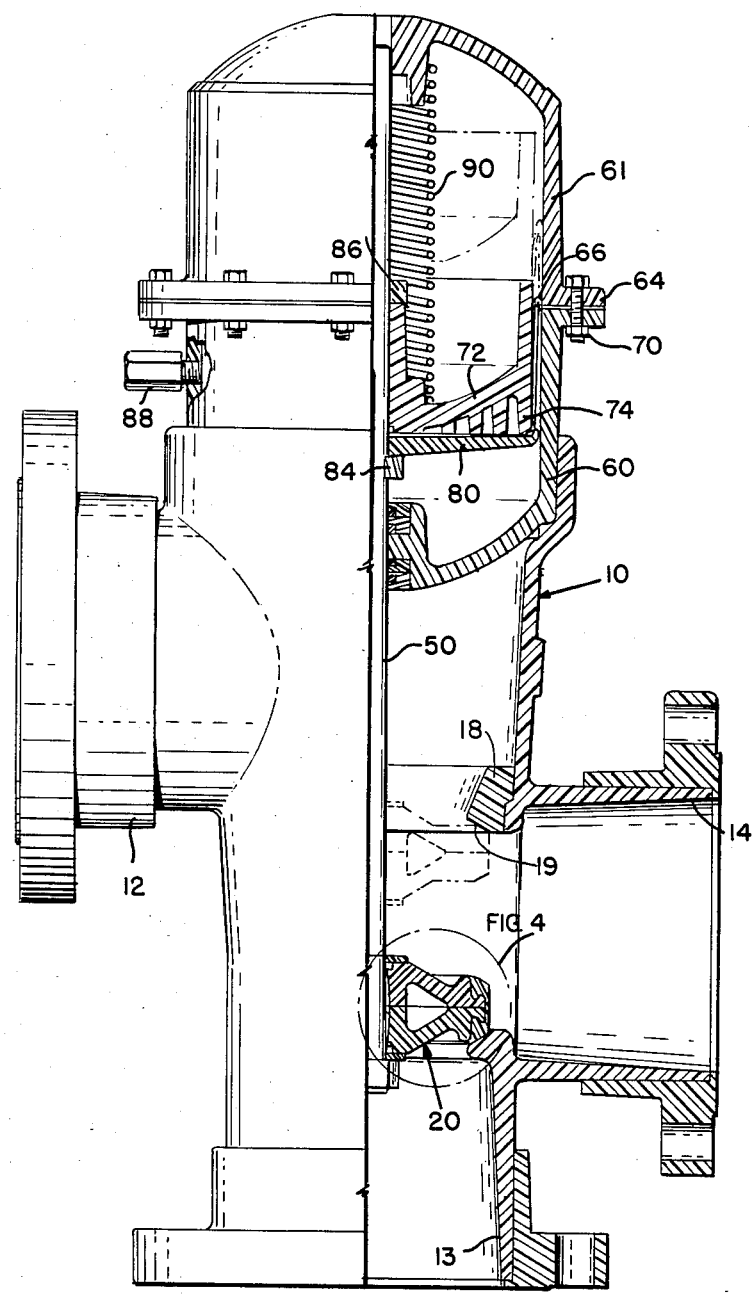
FIG. 2 is a longitudinal section taken along the lines 2—2 of FIG. 1.

As is best shown in FIG. 4, the recess is positioned along a line F that represents the line from the deepest part of the recess to a perpendicular through the point of contact on the sealing material 44 that first engages the sealing surface 17 of the seat 16. This is critically designed so that the substantial compressive force applied to seat the seal against the seal seat is transmitted into the thickest section of the sealing material, which is best able to withstand the force of the disk against the seat. In addition, as is readily apparent, the recess also mechanically interlocks the resilient sealing material to prevent rolling of the material out of engagement with the sealing disk under the substantial compressive loads between the sealing seat and the sealing disk.

It is also a unique feature of the sealing disk construction that thin-walled cross sections are provided, leaving a hollow between the two mating pieces when connected, as shown in FIG. 1. These thin walls allow for rapid cooling and thus high production of the parts in the molds, and reduce the chances of porosity occurring in the molded part, as is a condition with thickly molded parts. This construction gives the sealing disk considerable load resistance against the very substantial forces applied at the perimeter of the sealing disk. In addition, the length of the shearing surface 28 is considerably greater than the length of the abutting surface 27, so that any torsion loads applied about the center of the disk are withstood by this substantial length of shearing surface available between the two pieces.

In summary, the sealing disk is inexpensive to manufacture, highly corrosive-resistant, and of a suitable strength and construction that it can withstand enumerable cyclings of the valve between the seats 18 and 16 without damage.

As best shown in FIG. 1, the sealing disk is attached to an actuator rod 50 by typical washers and a nut 52 threaded on an end of the rod.

Another feature of the low-cost, improved plastic valve is at the opposite end of the valve body and includes a cylinder 60 and a cylinder cover 61. Cylinder 60 and cover 61 are also identically molded, mirror-image parts, which reduces the cost of manufacturing the valve. Each of the parts includes a flange 64. The flanges are connected together to trap a rubber diaphragm 66 by nuts and bolts 70. The diaphragm overlies a domed plastic piston 72 that is coupled to the rod 50. The piston is also provided with a plurality of radially spaced circular ribs 74. These ribs 74 provide additional strength to the domed piston 72 and also provide spacers to enable the diaphragm to lie substantially flat across the face of the piston. This allows the diaphragm to stretch uniformly under the pressure loading rather than to be stretched at the peripheral edge of the domed piston. A cap 80 is connected to the diaphragm and holds it on the piston by a threaded nut 84. The other end of the piston is held on the rod by a threaded nut 86.

The piston is pressure operated by an inlet port 88 and is spring returned by a spring 90.

In summary, the low-cost construction of the cylinder and cylinder cover and the low-cost, high-strength construction of the piston diaphragm arrangement enable the valve to function through numerous cycles in a highly corrosive environment without substantial damage.

While the preferred embodiment of the invention has been illustrated and described, it is to be understood that variations will be apparent to one skilled in the art. Accordingly, the invention is not to be limited to the specific form shown in the drawing.

We claim:

1. A valve having first and second axially aligned ports, each having a valve seat with a contact surface, comprising:

a valve actuating rod adapted to be moved axially past said seats;
   means for moving said actuating rod;
   a plastic valve disk having a hollow-interior connected to said rod, said valve disk having a circumferential mounting flange;
   said mounting flange for said valve disk including on each axially spaced side thereof a radially outer, axially protruding lip and a radially inner, axially protruding ledge, said lip and ledge forming a recess; and
   a deformable sealing ring tightly fitted over and secured to the entire periphery of said flange, wherein the mounting flange also mechanically interlocks the sealing ring to the valve disk.

2. The valve of claim 1, said sealing ring having an initial valve seat contact point that lies along a line that is perpendicular to the contact surface and passes through the center of said valve disk mounting flange recess.

3. The valve of claim 1, said hollow valve disk having two mirror image pieces joined to each other.

4. The valve of claim 1, said deformable sealing ring being molded in place on said valve disk mounting flange.

5. The valve of claim 1, said hollow valve disk having two mirror image pieces joined to each other, said deformable sealing ring being molded in place on said valve disk mounting flange.

6. The valve of claim 3, said two pieces of said valve disk each having a radially inner, axially extending short leg enegaging said actuator rod and terminating in a radially inner shear surface, and an elongated, thin-walled, concave body joined to said short leg and extending axially and radially outward to form a central hollow, the radially outer end of said concave body having a radially elongated, radially outer shear surface, the mirror-image pieces being joined with their respective hollows opposed to one another and the radially inner and radially outer shear surfaces abutting one another, the radially outer shear surfaces being substantially longer than the radially inner shear surfaces to withstand shear forces imposed on said valve disk when engaged against a valve seat, the two pieces thus forming a thin-walled but wide axial cross section valve disk to provide high strength against sealing loads.

7. The valve of claim 1, said seats being of molded plastic, one of said seats being integrally molded on said port and the other seat being bonded to the other axially aligned port.

8. The valve of claim 1, said means for moving said actuating rod including a plastic piston and diaphragm movable in a plastic cylinder, said piston having a domed body, the domed body having an inner open end and an outer end, the outer end engaging the diaphragm and having a plurality of circular, radially spaced ribs for supporting the diaphragm when exposed to fluid pressure, said diaphragm having a radially outer flange fastened to said cylinder, means for introducing pressurized fluid to said cylinder to move said piston to actuate the valve disk, and a return spring to move said piston in the opposite direction when said pressurized fluid is removed.

9. The valve of claim 8, said cylinder including two separate mirror-image parts, each having a central cylindrical portion terminating at an end flange and a domed end wall.

10. The valve of claim 3, said two pieces of said valve disk each having a radially inner, axially extending short leg engaging said actuator rod and terminating in a radially inner shear surface, and an elongated, thin-walled, concave body joined to said short leg and extending axially and radially outward to form a central hollow, the radially outer end of said concave body having a radially elongated, radially outer shear surface, the mirror-image pieces being joined with their respective hollows opposed to one another and the radially inner and radially outer shear surfaces abutting one another, the radially outer shear surfaces being substantially longer than the radially inner shear surfaces to withstand shear forces imposed on said valve disk when engaged against a valve seat, the two pieces thus forming a thin-walled but wide axial cross section valve disk to provide high strength against sealing loads, and said seats being of molded plastic, one of said seats being integrally molded on said port and the other seat being bonded to the other axially aligned port.

11. The valve of claim 3, said two pieces of said valve disk each having a radially inner, axially extending short leg engaging said actuator rod and terminating in a radially inner shear surface, and an elongated, thin-walled, concave body joined to said short leg and extending axially and radially outward to form a central hollow, the radially outer end of said concave body having a radially elongated, radially outer shear surface, the mirror-image pieces being joined with their respective hollows opposed to one another and the radially inner and radially outer shear surfaces abutting one another, the radially outer shear surfaces being substantially longer than the radially inner shear surfaces to withstand shear forces imposed on said valve disk when engaged against a valve seat, the two pieces thus forming a thin-walled but wide axial cross section valve disk to provide high strength against sealing loads, said seats being of molded plastic, one of said seats being integrally molded on said port and the other seat being bonded to the other axially aligned port, said means for moving said actuating rod including a plastic piston and diaphragm movable in a plastic cylinder, said piston having a domed body, the domed body having an open inner end and an outer end, the outer end engaging the diaphragm and having a plurality of circular, radially spaced ribs for supporting the diaphragm when exposed to fluid pressure, said diaphragm having a radially outer flange fastened to said cylinder, means for introducing pressurized fluid to said cylinder to move said piston to actuate the valve disk, and a return spring to return said piston when said pressurized fluid is removed, and said cylinder including two mirror-image parts, each having a central cylindrical portion terminating at an end flange and a domed end wall.

12. A valve having first and second axially aligned ports, each having a valve seat with a contact surface,
   a valve actuating rod having a valve disk, said rod adapted to be moved axially between said seats,
   means for moving said actuating rod including a plastic piston and a diaphragm movable in a plastic cylinder, said piston being fixed to said rod and having a domed body, the domed body having an inner open end and an outer end, the outer end engaging the diaphragm and having a plurality of circular, radially spaced ribs for supporting the diaphragm when exposed to fluid pressure, said diaphragm having a radially outer flange fastened to said cylinder, means for introducing pressurized fluid to said cylinder to move said piston to actuate the valve disk, and a return spring to move said piston in the opposite direction when said pressurized fluid is removed.

13. The valve of claim 12, said cylinder including two separate mirror-image parts, each having a central cylindrical portion terminating at an end flange and a domed end wall, said end flanges being joined together and the diaphragm held in said cylinder by being fixed between said end flanges.

* * * * *